United States Patent

[11] 3,611,945

| [72] | Inventors | Geoffrey John Easton<br>Christchurch;<br>Michael Anthony Stockford, Cambridge,<br>both of England |
|---|---|---|
| [21] | Appl. No. | 813,657 |
| [22] | Filed | Apr. 4, 1969 |
| [45] | Patented | Oct. 12, 1971 |
| [73] | Assignee | Tracked Hovercraft Limited<br>London, England |
| [32] | Priority | Apr. 5, 1968 |
| [33] |  | Great Britain |
| [31] |  | 16583/68 |

[54] VEHICLES FOR TRAVELLING ALONG A PREPARED TRACK AND METHOD OF USE
2 Claims, 6 Drawing Figs.

[52] U.S. Cl. .................................................. 104/32,
104/23 FS, 104/134, 105/178
[51] Int. Cl. ...................................................... B61k 1/00,
B61b 13/08, B61k 5/02
[50] Field of Search .......................................... 104/23 FS,
20, 32, 18, 27; 105/366, 178

[56] References Cited
UNITED STATES PATENTS

| 210,051 | 11/1878 | Post .......................... | 104/32 |
| 765,211 | 7/1904 | Thompson ................. | 105/178 |
| 85,829 | 1/1869 | James ........................ | 104/32 |
| 3,369,497 | 2/1968 | Driver ....................... | 104/23 FS |

*Primary Examiner*—Arthur L. La Point
*Assistant Examiner*—D. W. Keen
*Attorney*—Cameron, Kerkam & Sutton ABSTRACT: A tracked air cushion vehicle has a detachable passenger compartment. The compartment can carry extendable wheels which will engage an auxiliary track diverging from the vehicle track. If the wheels are extended and means securing the compartment to the vehicle are released, the compartment will automatically become detached and will travel along the auxiliary track as the vehicle continues along the vehicle track. In one use, passengers are conveyed directly from a city center terminal to the desired pier at an airport without leaving the compartment.

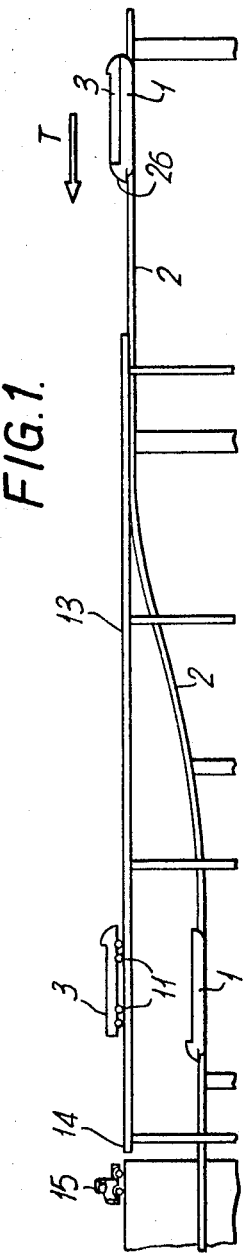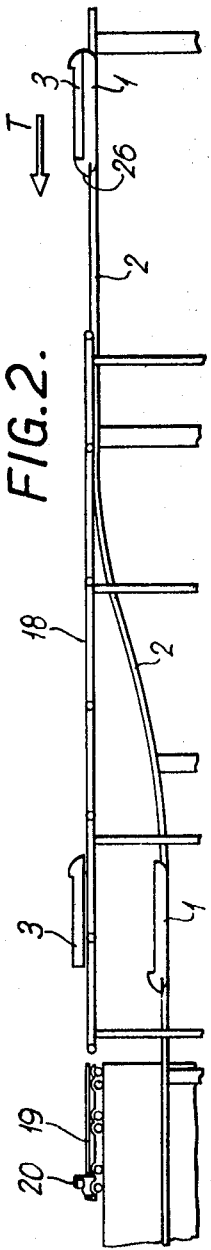

VEHICLES FOR TRAVELLING ALONG A PREPARED TRACK AND METHOD OF USE

This invention relates to vehicles for travelling along a prepared track supported out of contact with, and guided along the track at least partially by gas pressure acting on the vehicle, and to a method of conveying a load with such vehicles. Vehicles of this kind are described in U.S. Pat. No. 3,174,440.

Vehicles of this kind can dispense with wheels and accordingly are capable of high speed for example greater than 100 miles per hour, and one proposed use for these vehicles is to form a high-speed link between a city center terminal and an airport. It may be impractical to route the track to pass very close to the point where passengers board the aircraft, and one object of this invention is nevertheless to enable passengers and/or freight to be conveyed directly from the city terminal to any one of a number of aircraft-loading points at an airport.

According to the invention we provide a vehicle for travelling along a prepared track in combination with a compartment for containing a load (e.g., passengers or freight), said vehicle being adapted so that it can travel along the track at least partially supported out of contact with, and guided along, the track by air pressure acting on the vehicle, releasable means being provided for securing the compartment to the vehicle so that the compartment can travel with the vehicle without other means supporting the compartment from the track, and means enabling the compartment to be separated from the vehicle while the vehicle is travelling along the track, so that after removal of the compartment the vehicle can continue to travel along the track and the compartment can travel independently of the vehicle. The compartment can then be conveyed to any desired point, such as the boarding point for an aircraft, and the vehicle can travel to a point where it can receive another compartment.

Preferably for reasons of safety at a high speed the vehicle has side portions which straddle the track and which are closer together than the total width of the supporting surface of the track along which it travels in use. This makes it difficult to remove the vehicle from the track, and the invention is therefore particularly useful for this kind of vehicle.

According to another aspect of the invention we provide a method of conveying a load (e.g., passengers or freight) from a first point to a second point including introducing the load into a compartment, securing the compartment to a vehicle, moving the vehicle along a prepared track, while at least partially supporting the vehicle out of contact with, and guiding the vehicle along, the track by air pressure acting on the vehicle, the compartment being supported during travel along the track by the vehicle without other means of supporting the compartment from the track, and then separating the compartment form the vehicle while the vehicle is travelling along the track and moving the compartment independently of the vehicle to said second point.

The compartment may have a large volume, for instance larger than the vehicle without the compartment, and where the vehicle is intended for high speeds it is preferable that the compartment and vehicle when secured together present an aerodynamic profile suitable for high-speed travel.

The vehicle can be of the kind that is suspended below the track or of the kind supported over the track (both kinds are described in U.S. Pat. No. 3,174,440.

The compartment is preferably separated from the vehicle with vertical relative movement of the vehicle and the compartment, and the means enabling separation of the compartment are preferably on the compartment and engage an auxiliary track which diverges from the track for the vehicle. The separation enabling means may be movable between a position in which the means will engage the auxiliary track as the vehicle moves along the vehicle track to a position where the means will not engage the auxiliary track.

The compartment may move on to a moving auxiliary track but preferably the separation enabling means is a set of wheels adapted to roll on the auxiliary track.

Preferably the part of the auxiliary track along which the compartment travels just after separation is parallel with the portion of the vehicle track along which the vehicle travels just before separation. In this way the passengers in the compartment which is being separated are not subject to acceleration in the vertical sense. The auxiliary track may be inclined slightly downwardly to assist forward movement of the compartment. Where the vehicle is supported above the track the vehicle preferably moves downwardly away from the compartment upon separation. This can be achieved by inclining the track downwardly, or the vehicle can be lowered slightly on its track, for example by adjusting the suspension of the vehicle.

The compartment may extend the full length of the vehicle, or may extend only part of its length.

Control for the movement of the vehicle and for the separation of the compartment from the vehicle is preferably automatic.

In the accompanying drawings:

FIG. 1 is a diagrammatic side view of one embodiment of a vehicle according to the invention on a track showing the compartment before and after separation;

FIG. 2 is a view similar to FIG. 1 showing a modified embodiment of the invention;

FIGS. 1 and 2 show a vehicle 1 travelling along a prepared track 2 in combination with a compartment 3 for containing passengers. The vehicle 1 travels along the track 2 supported out of contact with, and guided along, the track 2 by air pressure acting on the vehicle 1. The vehicle 1 supports the compartment 3 which is secured to the vehicle 1 by releasable means as indicated at 4 (see FIG. 3) so that when the compartment 3 is secured to the vehicle 1 it travels with the vehicle 1 without other means of supporting it from the track 2. The compartment 3 can be separated from the vehicle 1 as will be described below.

Figure 3:
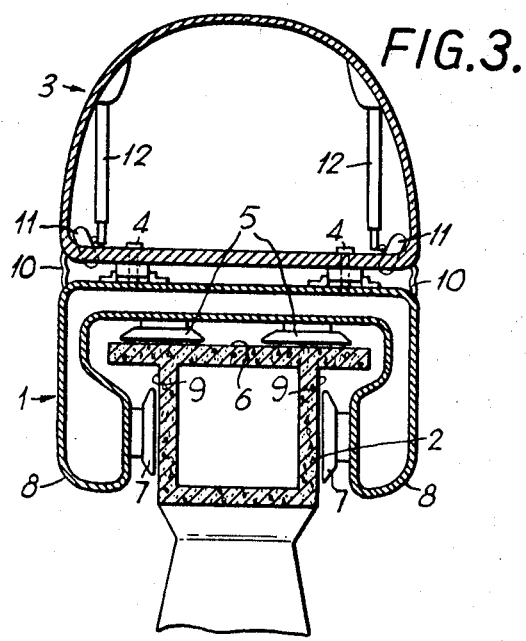
FIG. 3 is a vertical cross-sectional view through the vehicle shown diagrammatically in FIG. 1 before separation of the compartment.
Figure 4:
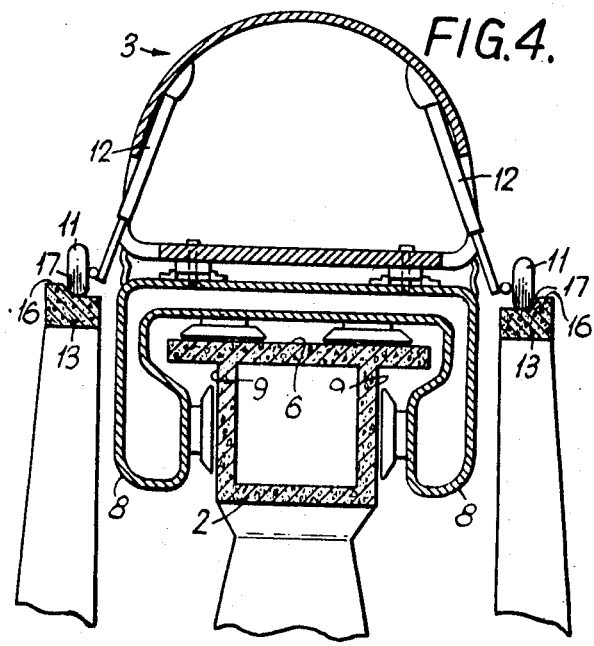
FIG. 4 is a view similar to FIG. 3 showing the vehicle and compartment at the moment of separation.

The vehicle 1 shown in FIGS. 3 and 4 has a number of pads 5 spaced from the bottom of the vehicle 1 which form cushions of pressurized air which support the vehicle 1 on a supporting surface 6 of the track 2. The vehicle 1 also has pads 7 on downwardly depending side portions 8 of the vehicle 1 which straddle the track 2. The pads 7 form cushions of pressurized air which guide the vehicle 1 from side surfaces 9 of the track 2. The side portions 8 of the vehicle are closer together than the total width of the supporting surface 6, and the vehicle 1 fits around the track 2 in such a way as to prevent any tendency for the vehicle to become separated from the track. The pads 5 and 7 are of the kind described in U.S. Pat. No. 3,477,387 or in Ser. No. 723,425, filed Apr. 23, 1969. The pads 5 and 7 have jets around their periphery which form a curtain of air, so that air cushions are contained between the vehicle 1 and the track 2.

The vehicle 1 is propelled along the track 2 by a linear electric induction motor as described in U.S. Pats. Nos. 3,356,041 and 3,361,081.

The compartment 3 has flexible seals 10 along both lower sides which cooperate with the vehicle 1 when the compartment 3 is secured to the vehicle 1 to prevent drag due to air turbulence.

The compartment 3 is shorter than the vehicle 1. The vehicle 1 has a nose portion 26 which extends to a height equal to the height of the top of the compartment 3, and the front of the compartment 3 abuts the rear of the nose portion 26 when the compartment 3 and vehicle 1 are secured so as together to present an aerodynamic profile suitable for high speed travel.

The compartment 3 has sets of wheels 11 which are mounted on swingable and telescopically extendable arms 12 for movement between the position shown in FIG. 4 where they extend laterally from the compartment 3 and can engage an auxiliary track 13, to the position shown in FIG. 3 where they are retracted so as not to project laterally from the compartment 3 so as not to engage the auxiliary track 13.

The auxiliary track 13 consists of two rails on either side of the vehicle track 2. The auxiliary track 13 does not extend along the whole length of the vehicle track 2 but only starts at a point where the compartment 3 is to be separated from the vehicle 1. The auxiliary track 13 and vehicle track 2 extend parallel to each other for a short distance in the direction of travel of the vehicle along the track 2, and then (as shown in FIG. 1) the track 2 is inclined downwardly away from the horizontal.

When a vehicle 1 and compartment 3 are travelling along the track 2 in the direction of the arrow T, they will together travel along the track 2 past the point where the track 2 diverges from the auxiliary track 13 if the sets of wheels 11 are kept retracted as shown in FIG. 3. If however the compartment 3 is to be separated from the vehicle 1 the wheels 11 are extended laterally as shown in FIG. 4 and the releasable means 4 securing 3. If however the securing the compartment 3 to the vehicle 1 are released. The compartment 3 and vehicle 1 will continue to travel together along the track 2 until the wheels 11 engage and roll on the auxiliary track 13.

The vehicle 1 will continue to travel along the track 2 which is now inclined downwardly and, while the vehicle 1 is moving, the compartment 2 will be separated from the vehicle 1 with vertical relative movement between the vehicle 1 and compartment 3. The compartment 3 is now supported solely by the auxiliary track 13 and since the track 13 remains horizontal the compartment 3 does not move with a vertical component of motion.

In a modification the auxiliary track may be inclined slightly downwardly to prevent the compartment rolling backwards and to assist forward movement.

The compartment 3 will move along the track 13 under its own momentum, and the compartment 3 is braked at the end 14 of the auxiliary track 13, for which purpose the wheels have brakes, although other braking systems could be used. At the end 14 of the auxiliary track 13 the compartment can be coupled to a conventional road cab 15 which can tow the compartment 3 along a conventional road system to any desired point. The two rails of the auxiliary track 13 have upstanding portions 16 on their outer edges with inclined faces 17 in order to guide the wheels 11.

The embodiment of the invention shown diagrammatically in FIG. 2 differs from that shown in FIGS. 1, 3 and 4 in that the means enable the compartment 3 to be separated from the vehicle 1 while the vehicle is moving does not consist of wheels, but instead consists of laterally movable projections which, when extended, engage a moving auxiliary track 18. The moving auxiliary track 18 conveys the compartment 3 to a point where the compartment 3 moves on to a trailer 19 towed by a road cab 20.

Figure 5:
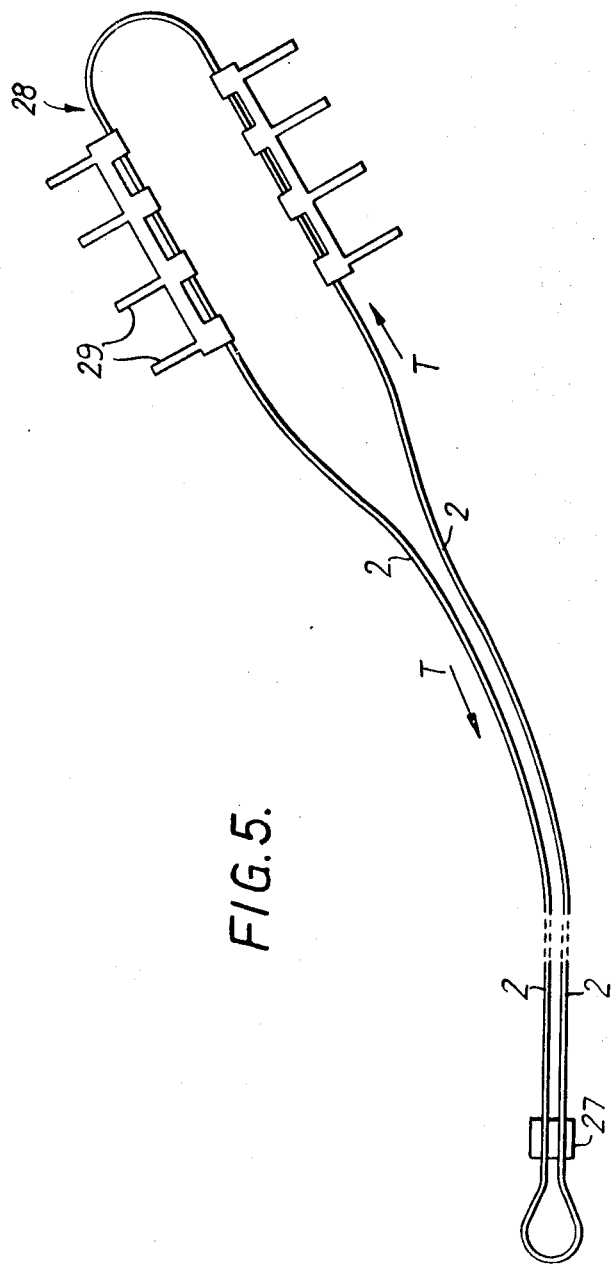
FIG. 5 is a diagrammatic plan view of a track arrangement from a city terminal to an airport.
Figure 6:
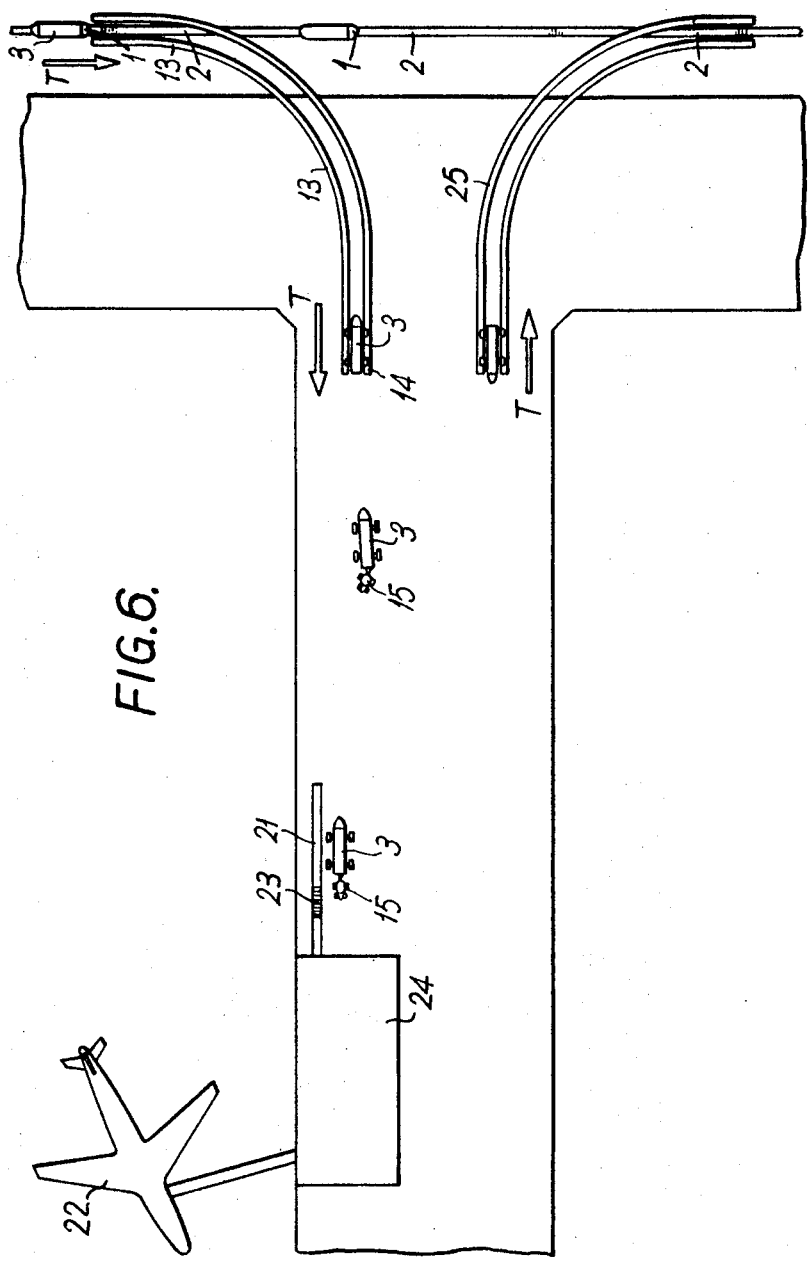
FIG. 6 is a diagrammatic plan view of a part of the track arrangement of FIG. 5 at an airport.

FIGS. 5 and 6 show the embodiment of the invention of FIG. 1 for use at an airport. The track 2 forms a continuous loop from a city center terminal 27 to an airport 28. The airport has a number of piers or fingers 29 to which the aircraft 22 approach, and from which the passengers can enter the aircraft 22. The direction of travel of the vehicle 1 along the track 2 is indicated by the arrow T. The auxiliary track 13 curves away from the track 2 and the end 14 is at an angle to the track 2. As the vehicle 1 travels along the track 2 the compartment 3, which has been filled with passengers and their luggage or freight at the city center terminal 27, can be separated from the vehicle 1 as described above and travels along the auxiliary track 13. At the end 14 of the auxiliary track 13 the compartment 3 is connected to a road cab 15 which tows the compartment 3 to a point 21 near the aircraft 22 that is to be boarded. An escalator 23 conveys the passengers to a holding lounge 24 from where they can enter the aircraft directly.

The empty compartment 3 can remain until filled with more passengers and luggage or freight to be conveyed to the city center terminal 27. The compartment 3 is then towed to another auxiliary track 25 similar to the auxiliary track 13 but which diverges from the track 2 in the opposite sense. In the direction of arrow T the track 2 is inclined upwardly towards the auxiliary track 25. By moving the compartment 3 along the auxiliary track 25 at the same speed as the vehicle 1, and so that the vehicle 1 and compartment 3 arrive together at the point where the tracks converge, the compartment 3 can be secured on to the vehicle 1 while it is moving. An arrangement is provided for moving the compartment 3 on the auxiliary track 25, and control of the vehicle 1 and compartment 3 is fully automatic.

More than one vehicle 1 can move along the track 2 connected together in tandem, each carrying its own compartment 3. Where, say, three vehicles are traveling in tandem it is possible for any of the three compartments 3 to be separated at one particular point where there is an auxiliary track 13. To do this only one compartment 3, which could be the center of the three compartments, is released from its vehicle 1 and extends its wheels 11. As the three vehicles pass the auxiliary track 13 only the center compartment will be separated from its vehicle.

The invention has the advantage that it enables a load to be conveyed quickly to a point where it may not be practical to route a track. The vehicle does not have to stop to load and unload. Furthermore the vehicle, which is expensive since it includes the drive motor and fans for providing air cushions, can be continuously in use, while the less expensive compartments are being loaded or unloaded. Fewer vehicles are therefore required. The capacity of the track is also increased because the payload is transferred in motion instead of at rest, as is usual.

We claim:

1. In combination, a vehicle, a main track of uniform width along which the vehicle is adapted to operate, and at least one compartment for carrying load releasably attachable to the vehicle so as to be supported and guided thereby along the main track, said main track extending continuously in both directions past at least one separation point at which the compartment may be separated from the vehicle and transported independently to a location spaced from the main track, said compartment having compartment support means extending therefrom in a transverse direction, and the main track having, in the same direction of vehicle travel, a first substantially horizontal track portion succeeded, in turn, by a downwardly inclined track portion, a second substantially horizontal track portion and an upwardly inclined track portion, the combination further including a first compartment support auxiliary track having at least one first support surface extending in a generally horizontal plane adjacent and parallel to the first substantially horizontal track portion and above the downwardly inclined track portion, and a second compartment support auxiliary track having at least one second support surface extending in a generally horizontal plane above the upwardly inclined track portion adjacent and parallel to the second substantially horizontal track portion, the disposition of the first support surface relative to the first substantially horizontal track portion being such that engagement of the respective compartment support means with the first support surface occurs to separate a compartment from the vehicle when the vehicle, having passed along the first substantially horizontal track portion while carrying the compartment, thereafter travels down the downwardly inclined track portion, and the disposition of the second support surface relative to the second substantially horizontal track portion being the same as the disposition of the first support surface relative to the first substantially horizontal track portion, whereby a compartment may be joined to the vehicle, when unloaded, at the upwardly inclined track portion.

2. The combination according to claim 1, wherein the main track includes, in the same direction of vehicle travel, a plurality of said downwardly inclined track portions alternate with a plurality of said upwardly inclined track portions, the downwardly inclined track portions being preceded by respective first substantially horizontal track portions and having associated therewith respective first compartment support tracks, and the upwardly inclined track portions being preceded by respective second substantially horizontal track portions and having associated therewith respective second compartment support tracks, each compartment having means for extending and retracting its compartment support means whereby a compartment may be separated from the vehicle at a selected one of the downwardly inclined track portions and, with the vehicle traveling the same direction, a further compartment may be joined to the vehicle at a succeeding upwardly inclined track portion.